United States Patent
Gerwig et al.

(10) Patent No.: US 6,275,839 B1
(45) Date of Patent: Aug. 14, 2001

(54) METHOD AND SYSTEM FOR IMMEDIATE EXPONENT NORMALIZATION IN A FAST FLOATING POINT ADDER

(75) Inventors: Günter Gerwig, Simmozheim; Klaus Jörg Getzlaff, Schönaich; Michael Kröner, Altdorf, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,316

(22) Filed: Oct. 15, 1998

(30) Foreign Application Priority Data

Sep. 22, 1998 (EP) .................................................. 98117896

(51) Int. Cl.⁷ ................................. G06F 7/42; G06F 7/50
(52) U.S. Cl. ........................................... 708/505; 708/714
(58) Field of Search ..................................... 708/505, 714

(56) References Cited

U.S. PATENT DOCUMENTS

| | | | |
|---|---|---|---|
| 4,719,589 | * 1/1988 | Tanaka | 708/505 |
| 4,994,996 | * 2/1991 | Fossum et al. | 708/505 |
| 5,373,461 | * 12/1994 | Bearden et al. | 708/505 |
| 5,392,228 | 2/1995 | Burgess et al. | |
| 5,684,729 | * 11/1997 | Yamada et al. | 708/505 |
| 5,694,350 | * 12/1997 | Wolrich et al. | 708/714 |
| 5,875,123 | * 2/1999 | Dao Trong et al. | 708/505 |

\* cited by examiner

*Primary Examiner*—Tan V. Mai
(74) *Attorney, Agent, or Firm*—Andrew J. Wojnicki, Jr.

(57) ABSTRACT

A method and system for use in a data processing system is proposed, wherein the Input Exponent is used already in the subblocks of the mantissa addition. Early in the flow of a cycle, there are parts of the Potential exponent result generated and put together using zero detect signals and carry select signals of the Carry Select Adder of the mantissa addition. For the addition of two floating point numbers this reduces the number of required logic gates in the timing critical path. This allows a faster cycle time and/or less latency and/or more complex functions. The method and system according to the invention can be applied to adders of different mantissa widths or different exponent widths as well as power of radix 2.

8 Claims, 7 Drawing Sheets

METHOD AND SYSTEM FOR IMMEDIATE EXPONENT NORMALIZATION IN A FAST FLOATING POINT ADDER

FIELD OF INVENTION

The present invention relates in general to an improved data processing system, and in particular to a method and system for adding floating point numbers.

BACKGROUND OF THE INVENTION

As the demand for better computer calculation performance increases, and particularly in regard to extension of floating point unit of next generation by Binary IEEE format which requires the support of JAVA programs, additional Logic is required in the Add-normalization path. The performance timing is most critical for the floating point units and prior art techniques could only achieve an addition of two floating point numbers mostly in three consecutive calculation steps
(1)—adding the mantissas,
(2)—counting the leading zero digits,
(3)—subtract the number of leading zero digits from the exponent to get the normalized exponent result. This work is usually a serialized work, i.e. a subsequent step can be calculated only when the preceding step is completed.

Some improvements to avoid the serialization time delay were presented in U.S. Pat. No. 5,392,228. Here, the normalizer employs a combination of LZA (leading zero anticipation) and LZD (leding zero detection) techniques. The LZA employed has an accuracy of +/– one bit position and thus can nearly determine the position of the leading one before the add result of the mantissas addition is available. Once the main add result is available, a mask is provided from the LZA output which is ANDed with the Add result to provide an accurate determination of the leading one position. This result is passed to both the shifting multiplexers and the exponent adjustment logic to compute the final floating point result. This so called 'big LZD' arrangement, however, requires a significantly larger area to implement compared to a strictly serialized implementation.

Despite this additional area consumption which could be tolerated in many applications the previously mentioned normalizer needs a further calculation step to convert the leading zero count into a normalized exponent result.

Further, it does not provide an exact result of the leading zero count and an additional mask operation step is necessary after the main add result is present to obtain the exact leading zero count, thus an additional time delay is required to perform this calculation step.

With the present extension to 128-bit mantissas the time consuming effect of a strictly serialized work would be aggravated, and the previously described normalizer would consume even more area and a larger calculation time.

In view of the above discussion, it should be apparent to those persons of ordinary skill in the art that a need exists for a method and system which saves calculation time.

SUMMARY OF THE INVENTION

It is therefore one object of the present invention to provide an improved method and system for adding floating point numbers and for adapting it to the extended Binary IEEE format required to support Java programs without additional latency.

It is another object of the present invention to provide an improved method and system for adding floating point numbers by which the additional calculation time originating from the extension of 64 bit to 128 bit floating point number calculation is compensated.

It is yet another object of the present invention to provide a method and system for fast adding floating point numbers with minimized hardware area required for the calculation time saving.

The foregoing objects are achieved as is now described.

The method according to the present invention defines a method to use the Input Exponent already in the subblocks of the mantissa Addition. Early in the flow of a cycle, there are parts of the Potential exponent result generated and put together using zero detect signals and carry select signals of the Carry Select Adder of the mantissa addition. For the addition of two 128 bit floating point numbers this reduces the number of required logic gates in the timing critical path from about 16 to 12 gates. This allows a faster cycle time and/or less latency and/or more complex functions. The method and system according to the invention can be applied to adders of different mantissa widths, e.g. 32, 64, 256, etc., or different exponent widths, e.g. 8, 10, 12, etc. and further power of radix 2 also.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
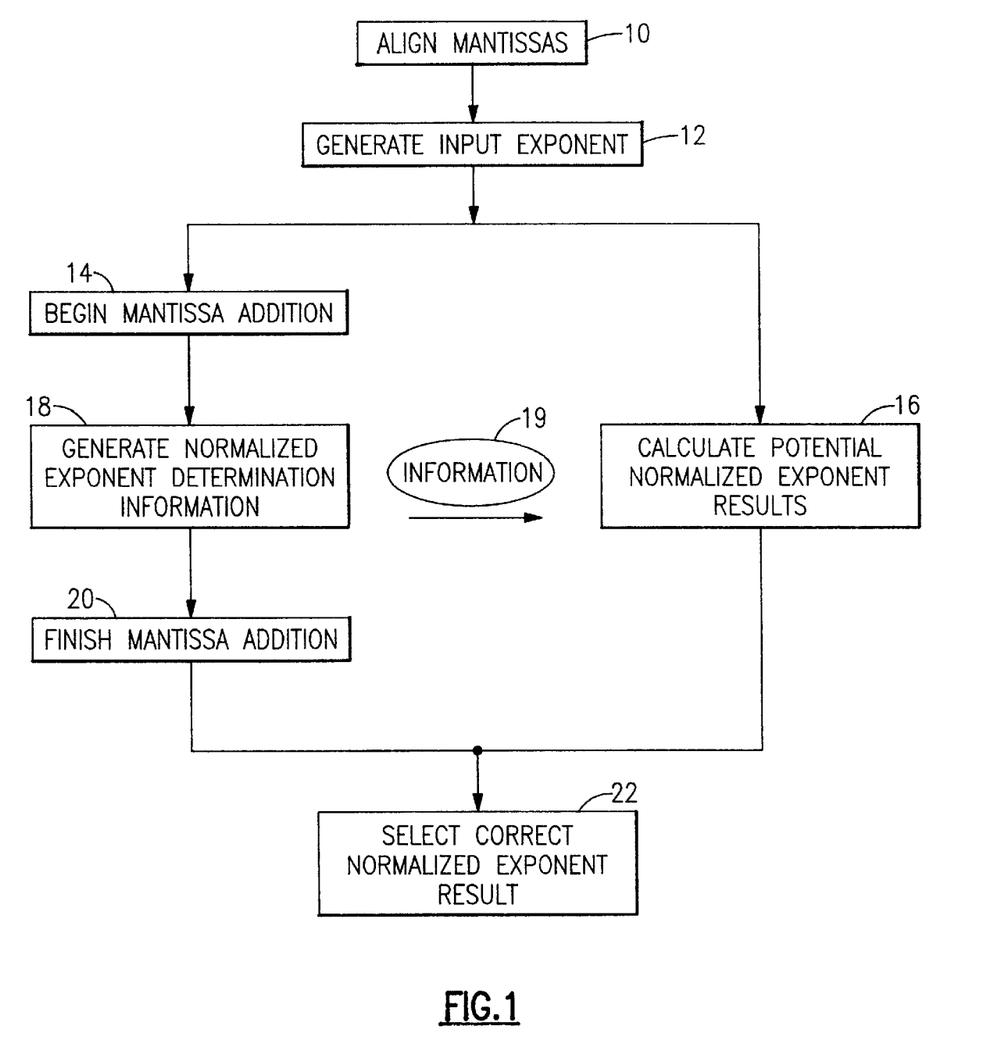
FIG. 1 depicts a schematic flowchart containing the essential steps of the method according to the present invention.

With general reference to the figures and with special reference now to FIG. 1 a schematic flowchart containing the essential steps of the method according to the present invention is given.

For achieving a fast floating point addition—and of course a corresponding subtraction—the mantissas of both numbers are aligned—10—and split up into a lower and a higher bit portion as it is done in prior art techniques. An Exponent common to both numbers is derived here from—12—.

Then, the operational flow is split up in two branches. In the left one mantissas are added—14—in groups of 16 bits and in the right one some potential normalized exponent results are concurrently calculated—16—according to the present invention.

In order to perform these left and right side procedures concurrently, some 'normalized Exponent determination information' 19 originating from the mantissa calculation part is needed in the Exponent calculation part and is thus transferred as soon as it is available.

Said information 19 comprises the lower half of the 8 bit Exponent Input, e.g. E(4 . . . 7) in each CSA 16 block. It is derived in each block by assuming the higher order mantissa bits were zero. For the higher 64 bit half, e. g. bits 0 . . . 63 of the mantissa addition this left side output serves as double input for right side, firstly, to the Exponent calculation part with Carry=0, e.g. CSA 64 block 32 and secondly to the corresponding block 34 with Carry=1.

For the lower bit half, e.g. bits 0 . . . 63 of the mantissa addition, E(4 . . . 7) serves as single input into the CSA 64 block 30.

With further consideration of each CSA 16 block's bit significance some Exponent Gating information is gathered during the mantissa addition without waiting for it's completion.

In a similar way the full exponent ER(0 . . . 7) is generated piecewise, again assuming all higher mantissa bits were zero.

After finishing—20—mantissa addition, the selection 22 of the correct normalized Exponent result is performed which will be described below in further detail.

Figures 2, 2B:
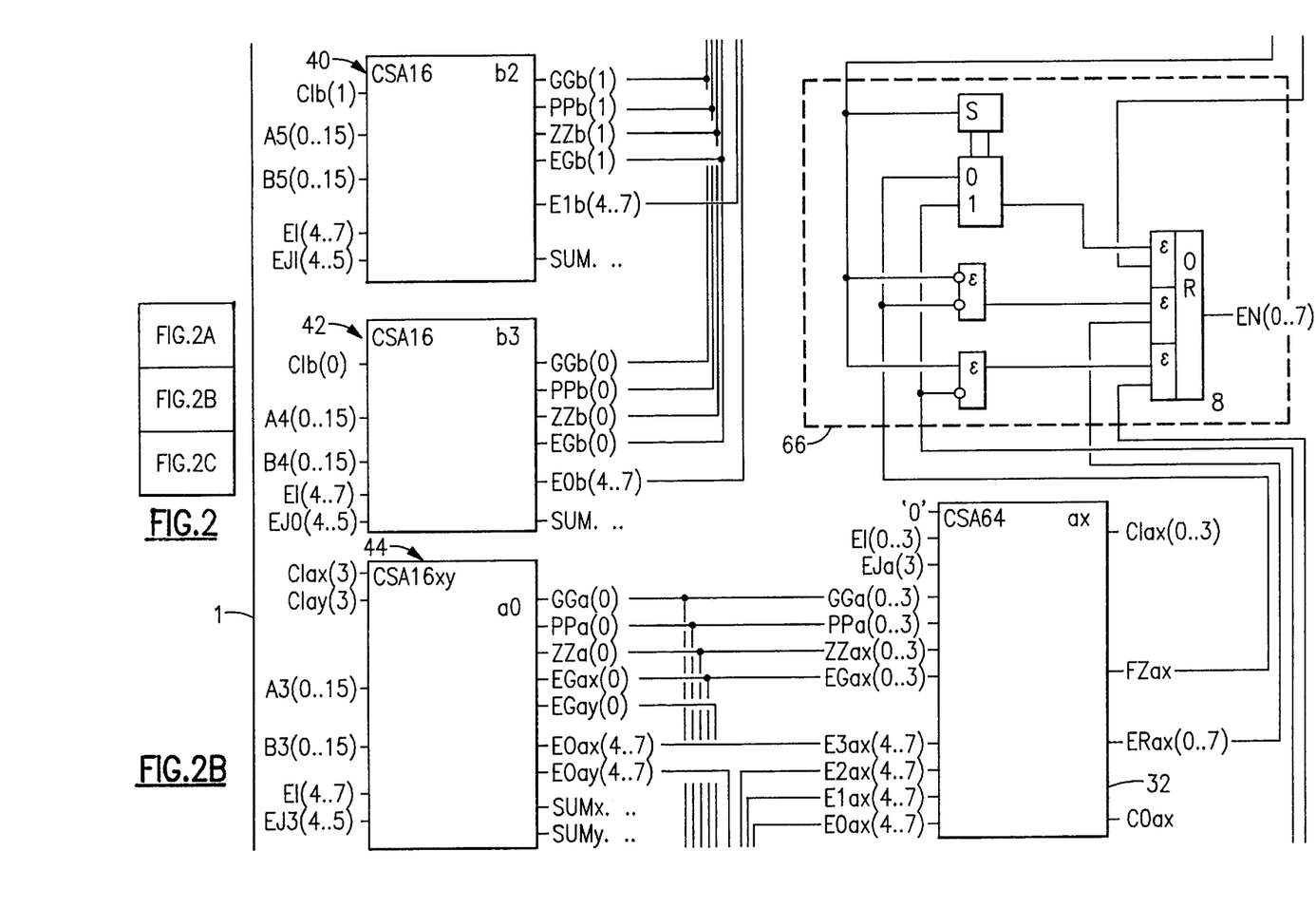
FIGS. 2A, 2B and 2C depict the schematic overview representation of an improved 128 bit Mantissa Adder in accordance with a preferred embodiment according to the present invention.
Figure 2A:
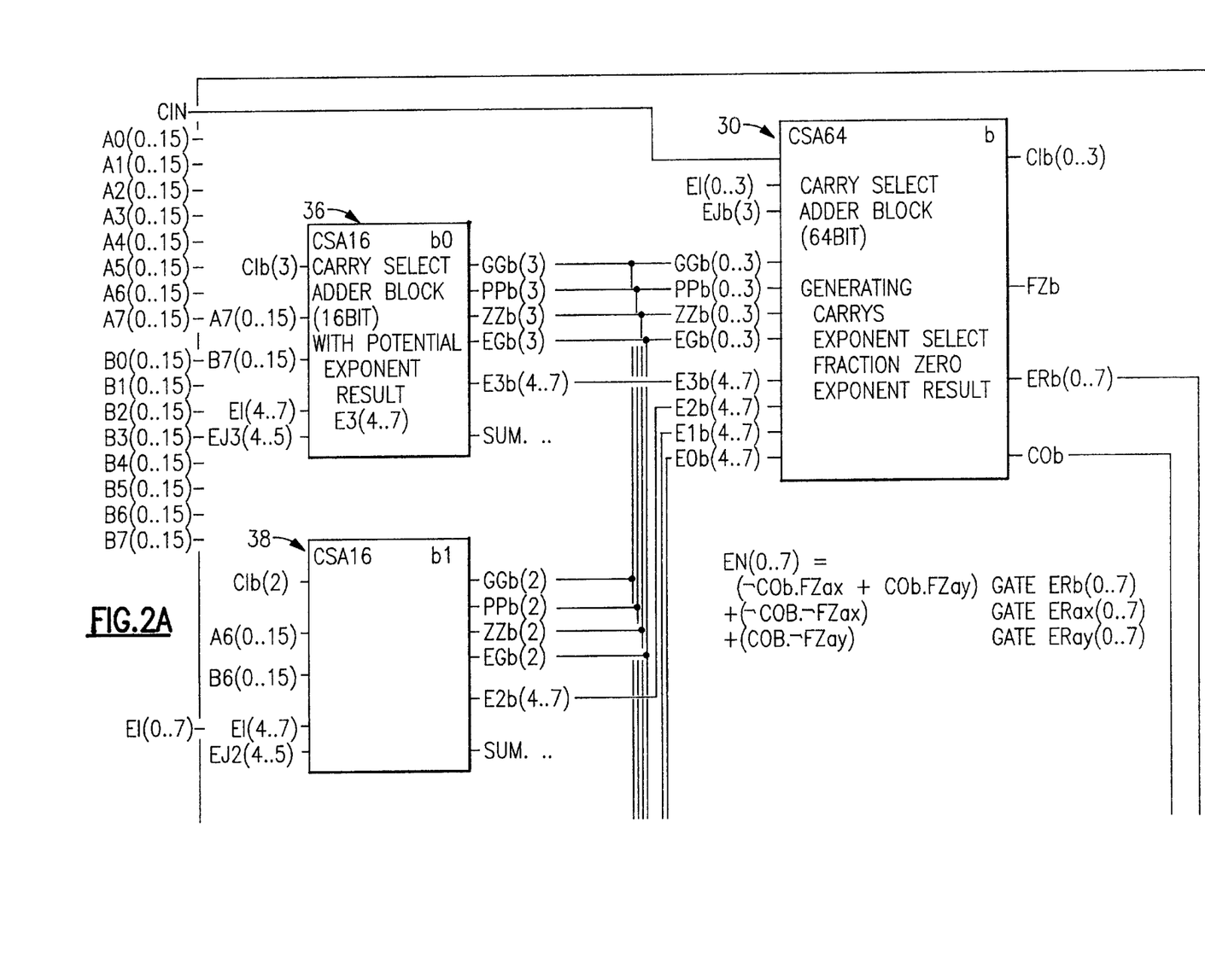
Figure 2C:
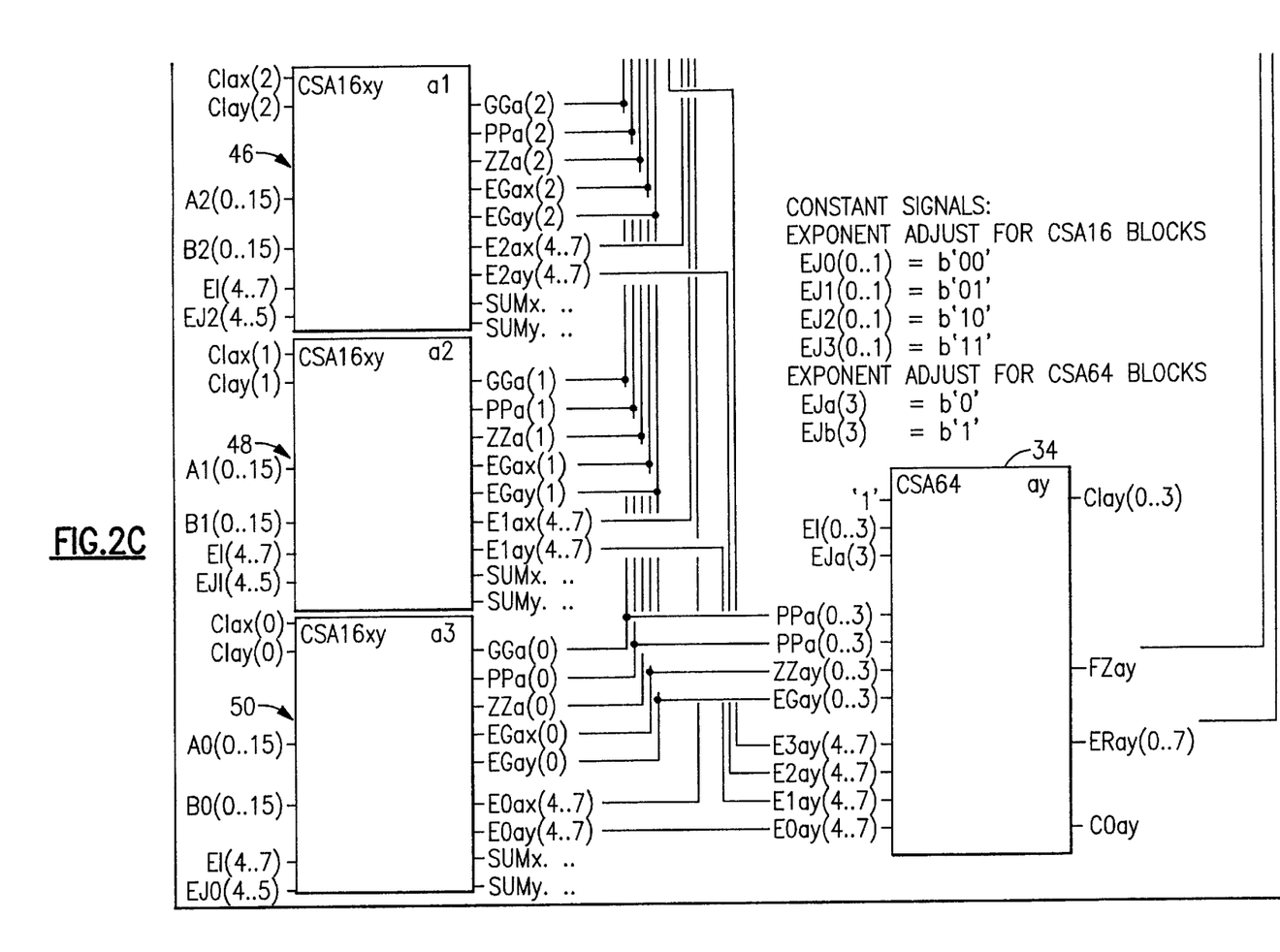

With general reference to the figures and with special reference now to FIGS. 2A, 2B and 2C are exemplary embodiment for an adder 1 of 128 bit mantissa width and an exponent width of 8 bit to the power of radix 16 is described next below. Thus, two floating point numbers consisting of pre-aligned mantissas A and B and thus a common eponent E are added according to the method and system of the present invention.

Further, the following naming definitions and conventions are given for a better understanding of the accompanying drawings:

Bit No. 0 highest bit, e.g. Bit 15 lowest bit in group of 16 bits
Digit: Group of four bits
A: Mantissa A (128bit) divided in A0(0 . . . 15), A1( . . . to A7(0 . . . 15)
B: Mantissa B (128bit) divided in B0(0 . . . 15), B1( . . . to B7(0 . . . 15)
CIN or CI: Carry Input
CSA: Carry Select Adder
G: Generate
p: Propagate
GD: Generate for Digit
PD: Propagate for Digit
ZD: Zero Digit
GG: Generate for 16 bit (4 digits)
PP: Propagate for 16 bit (4 digits)
ZZ: Zero Signal for 16 bit (4 digits)
SUM: Result of mantissa addition
EI: Exponent Input (8 bit)
E0 . . . E3: Potential Exponent of 16 bit block CSA16
ER: Potential Exponent of 64 bit block CSA64
EN: Normalized Exponent (Result)
EJ: Exponent Adjust (indicates significance of block)
EG: Exponent Generate (of bit Pos 4 to 7-G47)
G67: Exponent Generate (of bit Pos 6 to 7)
a: related to high 64 bit
b: related to low 64 bit
x: related to high 64 bit with carry=0
y: related to high 64 bit with carry=1
CO: Carry Out of a 64 bit block
EI: Exponent Input (8bit)
SN: Sum Normal without Carry In (A+B)
SP: Sum Plus_1 with Carry In (A+B+1)
SX: Sum in case CI=0
SY: Sum in case CI=1
ZDN: Zero Digit without Carry IN (A+B)
ZDP: Zero Digit with Carry IN (A+B+1)
ZDX: Zero Digit in case CI=0
ZDY: Zero Digit in case CI=1
DS_X: Digit Select for Digit in case CI=0
DS_y: Digit Select for Digit in case CI=1
In a Boolean expressin or equation a '.' means 'AND'.

According to the invention the 128 bit Mantissa Adder 1 is structured into a 'high' 64 bit (a) and 'low' 64 bit (b) portions, i.e. partitions. Both 64 bit partitions are divided into four (0 . . . 3) 16 bit subpartitions 36, 38, 40, 42 and 44, 46, 48, 50, respectively. According to the invention in each of the 16 bit subpartitions a normalized Exponent determination information circuit 68 determines output signals which serve as pre-information to calculate potential normalized Exponents. This information comprises the 'low' four Exponent bits E(4 . . . 7) which are generated immediately partition by partition, e.g. piecewise while it is assumed all higher mantissa bits were zero. This is depicted and described in more detail in FIG. 3.

In a similar way the full exponent ER(0 . . . 7) is generated piecewise, again assuming all higher mantissa bits were zero.

Since the Carry out of the 'low' 64 bit (C0b)—see the CSA 64 block 30 in the upper right portion of FIG. 2A—is a late signal, the calculation for the 'high' 64 bit has to be done twice, with assumed Carry in active and without. This is done in blocks 32, 34, respectively. The selection of the final normalized Exponent depends therefore from the Carry Out of the low 64 bit (C0b) and from the Fraction Zero signal of the two potential high 64 bit parts FZax and Fzay, respectively, see the output of the CSA 64 block 32 in FIG. 2B and the block 34 in FIG. 2C and the output of the CSA 64 block in FIG. 4.

Figure 3:
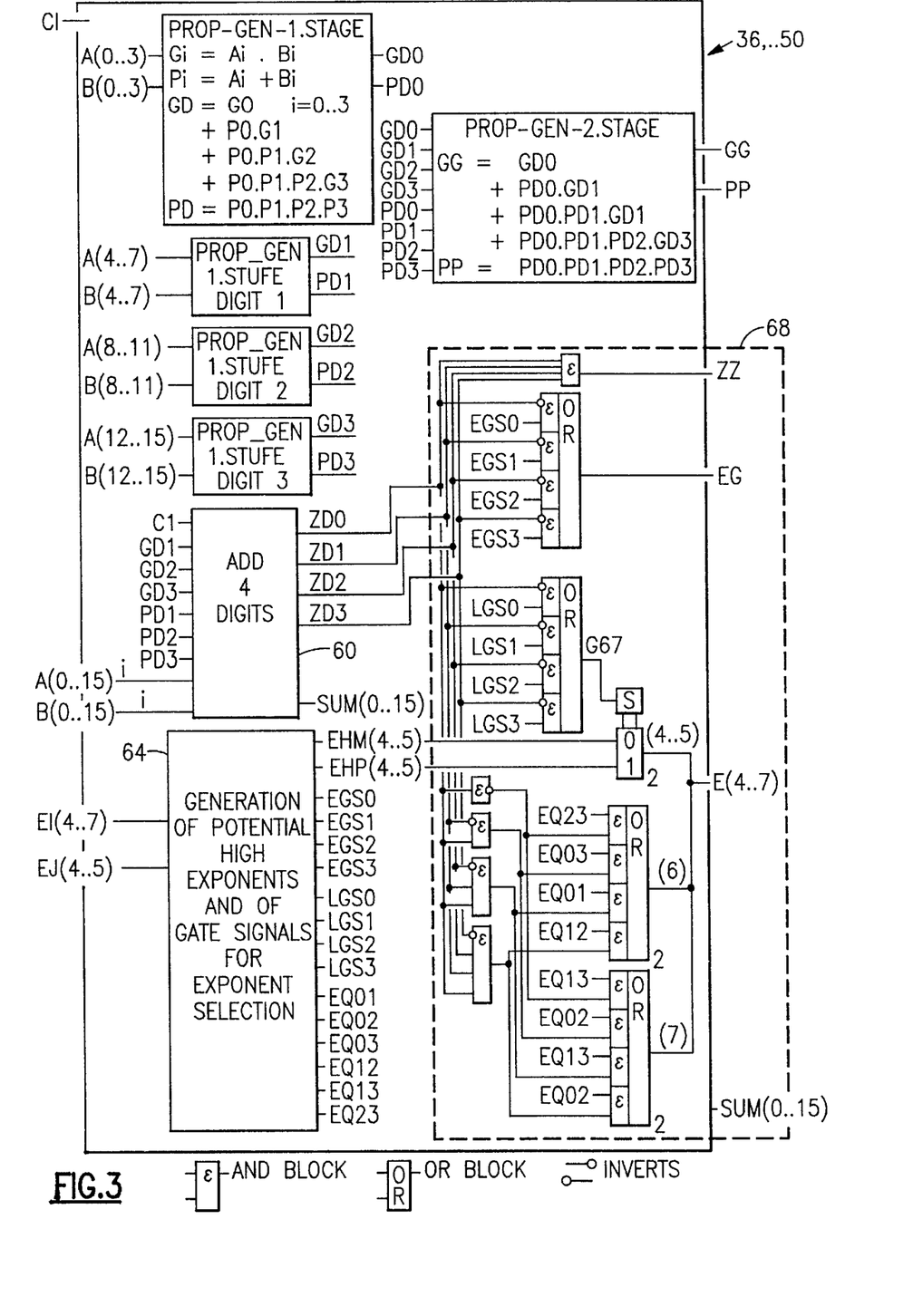
FIG. 3 is a schematic block diagram of the implementation of a 16 bit Carry Select Adder block from FIGS. 2A, 2B and 2C in accordance with the present invention.
Figure 5:
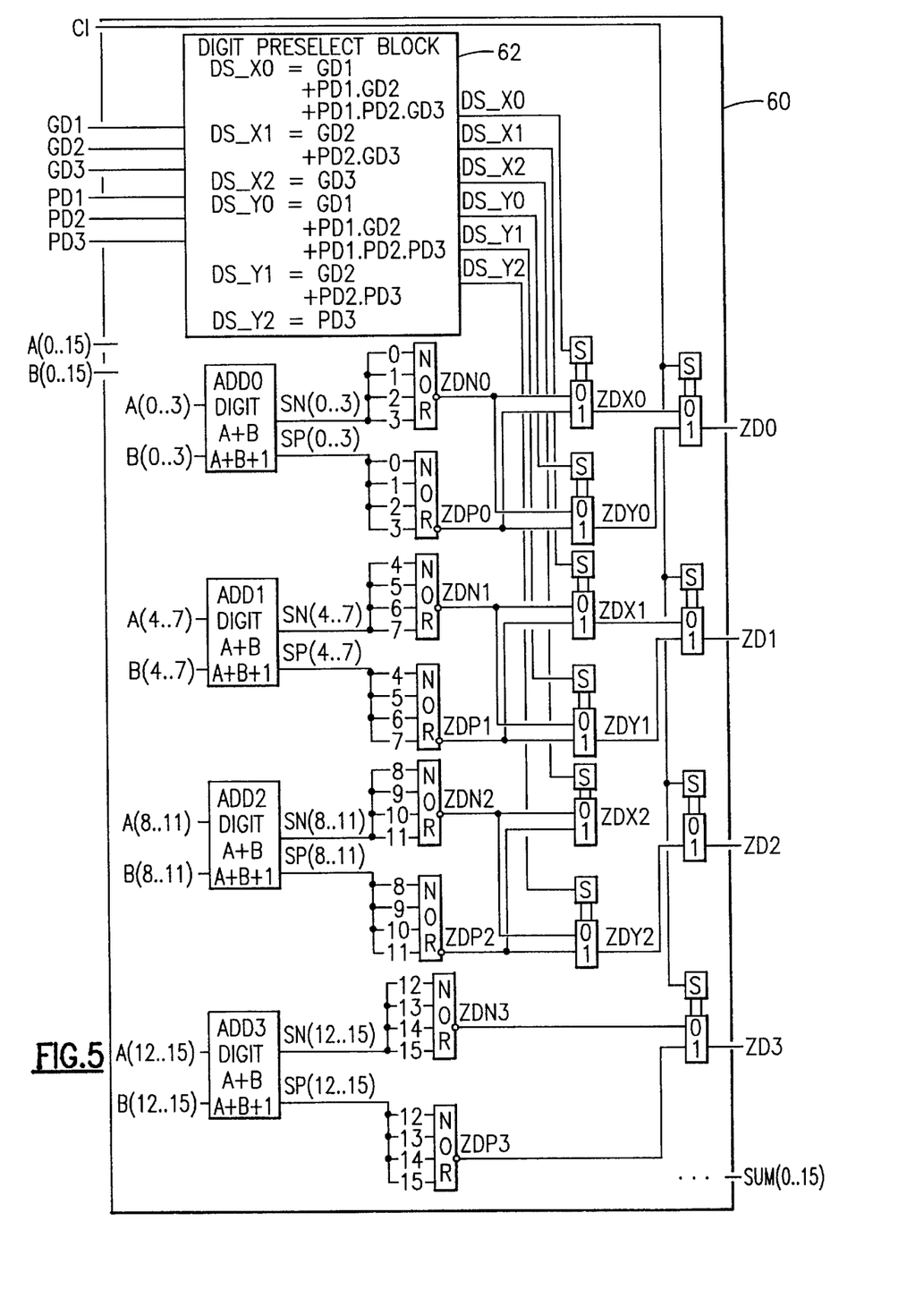
FIG. 5 is a schematic block diagram of the implementation of a block in accordance with the present invention in which 'Zero Digit Signals' are generated' as a part of the immediate Exponent calculation by means of 'ADD 4 Digits' blocks.

With special reference now to FIG. 3 and FIG. 5, the Signal EJ (Exponent AdJust) indicates the bit significance of the high order bit to each Carry Select Adder block 36, . . . 50. The two bits EJ(4 . . . 5) indicate to a CSA16 block which of 4 possible positions within 64 bit it has. This information is needed to generate a partly potential normalized Exponent assuming all 'higher' bits were zero.

Next below, the operation of the mechanism in the CSA16 Carry Select Adder Block for 16 bit calculations is described in a more formalistic way by the following Boolean equations and expressions, respectively which are realized each by hardware implementation. This is given for complete understanding of the details:

```
SUM0 = A + B
SUM = A + B + CI
for each Digit (4bit):
  Gi = Ai . Bi              i=0..3
  Pi = Ai + Bi
  GD = G0 + P0.G1 + P0.P1.G2 + P0.P1.P2.G3
  PD = P0.P1.P2.P3
  ZD = (SUM == b'0000')
for 4 digits (16bits):
  GG = GD0                  (SUM0 > x'FFFF')
     + PD0.GD1
     + PD0.PD1.GD2
     + PD0.PD1.PD2.GD3
```

-continued

| | |
|---|---|
| PP = PD0.PD1.PD2.PD3 | (SUM0 == x'FFFF') |
| ZZ = ZD0.ZD1,ZD2,Z03 | (SUM == x'0000') |

Inputs for said CSA16 block are the 16 bit entries A(0 . . . 15) and B(0 . . . 15), respectively, the lower digits EI(4 . . . 7) of the input Exponent and EJ(4 . . . 5) which indicates the significance of a block, and a possible external Carry Input CI.

The 16 bit CSA generates a partial Sum (0 . . . 15) from the 16 bit entries A(0 . . . 15) and B (0 . . . 15) and an eventual Carry Out, see GG and PP and Sum output of FIG. 3. This work is done piecewise in four pieces 4 bit long each correspondingly applying the formulae given in the block in the upper left corner of FIG. 3. This first stage produces a plurality of outputs GD and PD. The suffix D in the nomenclature used herein generally means 'digit'.

These outputs serve firstly as input to the second stage of the mantissa adder, see 'Prop. Gen.-2.stage' block in the upper right corner of FIG. 3 and secondly according to the present invention as input for an immediate calculation of parts, i.e. pieces of the potential Exponent with help of generating so-called 'Zero Digit signals', mentioned as ZD0 . . . ZD3 output of the block 60 depicted in FIG. 3, and as ZZ in FIGS. 2 through 4, respectively.

The Sum of the mantissa digits—each 4 bit long bit groups—is built twice: SN (=Sum Normal) assumes that no Carry has to be added to that digit while SP (=Sum Plus means that a Carry has to be added.

$$SN(0 \ldots 3)=A(0 \ldots 3)+B(0 \ldots 3)+0 \text{ and}$$

$$SP(0 \ldots 3)=A(0 \ldots 3)+B(0 \ldots 3)+1$$

The same is done now for the 'early' or 'immediate' Exponent calculation in a plurality of 'Add 4 digits blocks' 60 depicted as a summarizing block in the left side center portion of FIG. 3, and particularly shown in FIG. 5.

GD, PD inputs are shown to be fed into the block 60 of the FIG. 3. Said 4 bit adder can be implemented as ordinary state-of-the-art adder. The calculations executed herein are not timing critical in the diction of the present invention.

The Zero Digit Signal is also each built for the two cases, ZDN assuming that no carry has to be added and ZDP assuming a carry has to be added.

First, out of timing calculation reasons the signals GD, PD pass a Digit Preselect block 62, shown in the upper part of FIG. 5, which serves as first stage of the carry select mechanism which pre-analyses if a 4 bit block—e.g. the sum resulting from A (4 . . . 7) and B (4 . . . 7) generates a Carry Out or not. If it generates a Carry the corresponding output signal DS_X0 . . . 2 or DS_Y0 . . . 2, is active, otherwise not. Thus, this block calculates the internal propagation signals DS_X and DS_Y and the Zero Digit signals ZDX and ZDY—serving according to the present invention as pre-information for the Exponent calculation—can be selected out of ZDN and ZDP. The final selection for this block is done with the Carry IN (CI) signal which eventually transfers a further Carry from a similar block of minor bit priority. Thus, the signals ZD0, ZD1, ZD2 and ZD3 are generated.

Next, the determination of the pre-information serving to determine the normalized Exponent as early as possible is described with reference to circuits 64 and 68. In the left side bottom block 64 in FIG. 3 potential high Exponents and gate signals for the exponent selection are generated. This pre-decoding of the signals EQ, EGS and LGS is not timing critical and can thus be done in state-of-the-art logic.

The latter signals serve according to the present invention to do all possible preselection in a non timing critical hardware. The (final) selection of EG and E is done afterwards by simple multiplexers only, when the mantissa addition result is present.

First, in block 64 an internal predecoding of the immediate Exponent normalization procedure which is not timing critical takes place:

The following equations apply for the lower Exponent part decoding:

$$EQ01=(EI(6 \ldots 7)==b`00`)+(EI(6 \ldots 7)==b`01`)$$

$$EQ02=(EI(6 \ldots 7)==b`00`)+(EI(6 \ldots 7)==b`10`)$$

$$EQ03=(EI(6 \ldots 7)==b`00`)+(EI(6 \ldots 7)==b`11`)$$

$$EQ12=(EI(6 \ldots 7)==b`01`)+(EI(6 \ldots 7)==b`10`)$$

$$EQ13=(EI(6 \ldots 7)==b`01`)+(EI(6 \ldots 7)==b`11`)$$

$$EQ23=(EI(6 \ldots 7)==b`10`)+(EI(6 \ldots 7)==b`11`)$$

Thus, for exemplary explanation of the first row, the output signal EQ01 would be active if bit No.6 was 0 and bit No. 7 of the input Exponent was 0, or, if bit No.6 was 0 and bit No. 7 of the input Exponent was 1.

In the predecoding for Exponent Gating Output EG which serves for adjustment of the different bit priority in the Exponent's bits the following equations apply:

```
EGS0 = (EJ(4..5) == b'00')
     +(EJ(4..5) == b'01') . (EI(4..7) >= b'0100')
     +(EJ(4..5) == b'10') . (EI(4..7) >= b'1000')
     +              (EI(4..7) >= b'1100')
EGS1 = (EJ(4..5) == b'00') . (EI(4..7) >= b'0001')
     +(EJ(4..5) == b'01') . (EI(4..7) >= b'0101')
     +(EJ(4..5) == b'10') . (EI(4..7) >= b'1001')
     +              (E1(4..7) >= b'1101')
EGS2 = (EJ(4..5) == b'00') . (EI(4..7) >= b'0010')
     +(EJ(4..5) == b'01') . (EI(4..7) >= b'0110')
     +(EJ(4..5) == b'10') . (EI(4..7) >= b'1010')
     +              (EI(4..7) >= b'1110')
EGS3 = (EJ(4..5) == b'00') . (EI(4..7) >= b'0011')
     +(EJ(4..5) == b'01') . (EI(4..7) >= b'0111')
     +(EJ(4..5) == b'10') . (EI(4..7) >= b'1011')
     +              (EI(4..7) == b'1111')
```

The signal EG (Exponent Generate) is active when a generate is coming out of the four lower bits (4 . . . 7) of the Exponent calculation assuming that this 16 bit block would be the first not being zero. The signals EG are needed for further Exponent selection in the CSA 64 blocks 30, 32, 34.

Similarly, in the predecoding for internal low Exponent Gating the following equations apply:

$$LGS0=(b `1`) (`\text{always active}`)$$

$$LGS1=(EI(6 \ldots 7)>=b`01`)$$

$$LGS2=(EI(6 \ldots 7)>=b`10`)$$

$$LGS3=(EI(6 \ldots 7)==b`11`)$$

Furthermore, the preselection Exponents EHP and EHM are precalculated:

$$EHP(4 \ldots 5)=EI(4 \ldots 5)-EJ(4 \ldots 5)$$

(Input Exponent minus Exponent AJust (Bias))

$EHM(4 \ldots 5)=EI(4 \ldots 5)-EJ(4 \ldots 5)-b`01`$

Furthermore, there are timing critical parts of the immediate Exponent normalization:

Firstly, the internal Exponent gating, e.g. Generate out of position 6,7 in which the following formula applies:

$G67=ZD0.LGS0+ZD1.LGS1+ZD2.LGS2+ZD3.LGS3$

Secondly, the external Exponent gating, e.g. potential Generate G47:

$EG=ZD0.EGS0+ZD1.EGS1+ZD2.EGS2+ZD3.EGS3$ and the final Exponent calculation:

$E(4 \ldots 5)=G67 \text{ SEL}(EHP(4 \ldots 5),EHM(4 \ldots 5))$

| | |
|---|---|
| E(6)=(ZD0 | EQ23)+ |
| (ZD0. ZD1 | EQ03)+ |
| (ZD0.ZD1. ZD2 | EQ01)+ |
| (ZD0.ZD1.ZD2. ZD3 | EQ12) |
| E(7)=(ZD0 | EQ13)+ |
| (ZD0. ZD1 | EQ02)+ |
| (ZD0.ZD1. ZD2 | EQ13)+ |
| (ZD0.ZD1.ZD2. ZD3 | EQ02) |

The Select-circuit—'S' depicted over an 0/1 gate as done in the center portion of FIG. 3 and in further figures, too, generally serves to select a certain signal state to be realized in the line crossing below:

State 'Active' is realized when S holds the value '1' and state 'Inactive' is realized when S holds the value '0'.

In a variation of the present embodiment the selection of ZD with CIN (CI) is removed if the logic for generating ZZ, EG, and E would be doubled and these signals being selected with CI. This would need more hardware but could improve timing.

In another variation it is possible to gate the zero digits in this stage, to reduce the Exponent normalization to a certain area of the adder which can be useful in handling short operands. This, however, is not explicitly shown in the underlying embodiment.

The operation of the higher order (suffix a0 ... a3) CSA16 blocks is similar to that one described above but some logic is doubled to calculate the Exponent with potential Carry In and without Carry In.

To reflect this the indexes 'x' relate to calculations with Carry In=0, indexes 'y' relate to calculations with Carry In=1.

$SUM0=A+B$ $SUMx=A+B+CIx$ $SUMy=A+B+CIy$ for each Digit(4bit):

$Gi=Ai.Bi \; i=0 \ldots 3$ $Pi=Ai+Bi$ $GD=G0+P0.G1+P0.P1.G2+P0.P1.P2.G3$ $PD=P0.P1.P2.P3$ $ZDx=(SUMx==b`0000`)$ $ZDy=(SUMy==b`0000`)$ for 4 digits (16bit):

$GG=(SUM0>x`FFFF`)$ $PP=(SUM0==x`FFFF`)$ $ZZx=(SUMx==x`0000`)$ $ZZY=(SUMy==x`0000`)$

The internal predecoding of the immediate Exponent normalization is the same as described above.

The timing critical part of the immediate Exponent normalization comprises first internal Exponent gating (Generate out of position 6,7):

$G67x=ZDx0.LGS0+ZDx1.LGS1+ZDx2.LGS2+ZDx3.LGS3$ $G67y=Zdy0.LGS0+Zdy1.LGS1+ZDy2.LGS2+ZDy3.LGS3$

For the external Exponent gating (potential Generate G47) the following equations apply:

$EGx=ZDx0.EGS0+ZDx1.EGS1+ZDx2.EGS2+ZDx3.EGS3$ $EGy=Zdy0.EGS0+Zdy1.EGS1+ZDy2.EGS2+ZDy3.EGS3$ $Ex(4 \ldots 5)=G67x \text{ SEL}(EHP(4 \ldots 5),EHM(4 \ldots 5))$

| | |
|---|---|
| Ex(6)=(ZDx0 | EQ23)+ |
| (ZDx0. ZDx1 | EQ03)+ |
| (ZDx0.ZDx1. ZDx2 | EQ01)+ |
| (ZDx0.ZDx1.ZDx2. ZDx3 | EQ12) |
| Ex(7)=(ZDx0 | EQ13)+ |
| (ZDx0. ZDx1 | EQ02)+ |
| (ZDx0.ZDx1. ZDx2 | EQ13)+ |
| (ZDx0.ZDx1.ZDx2. ZDx3. EQ02) | |

$Ey(4 \ldots 5)=G67y \text{ SEL}(EHP(4 \ldots 5),EHM(4 \ldots 5))$

| | |
|---|---|
| Ey(6)=(Zdy0 | EQ23)+ |
| (Zdy0. Zdy1 | EQ03)+ |
| (Zdy0.Zdy1. ZDy2 | EQ01)+ |
| (Zdy0.Zdy1.ZDy2. ZDy3. EQ12) | |
| Ey(7)=(Zdy0 | EQ13)+ |
| (Zdy0. Zdy1 | EQ02)+ |
| (Zdy0.Zdy1. ZDy2 | EQ13)+ |
| (Zdy0. Zdy1. ZDy2. ZDy3. EQ02) | |

With special reference now to FIG. 4 and FIGS. 2A, 2B and 2C, the structure and operation of a CSA 64 block will be described next below.

Figure 4:
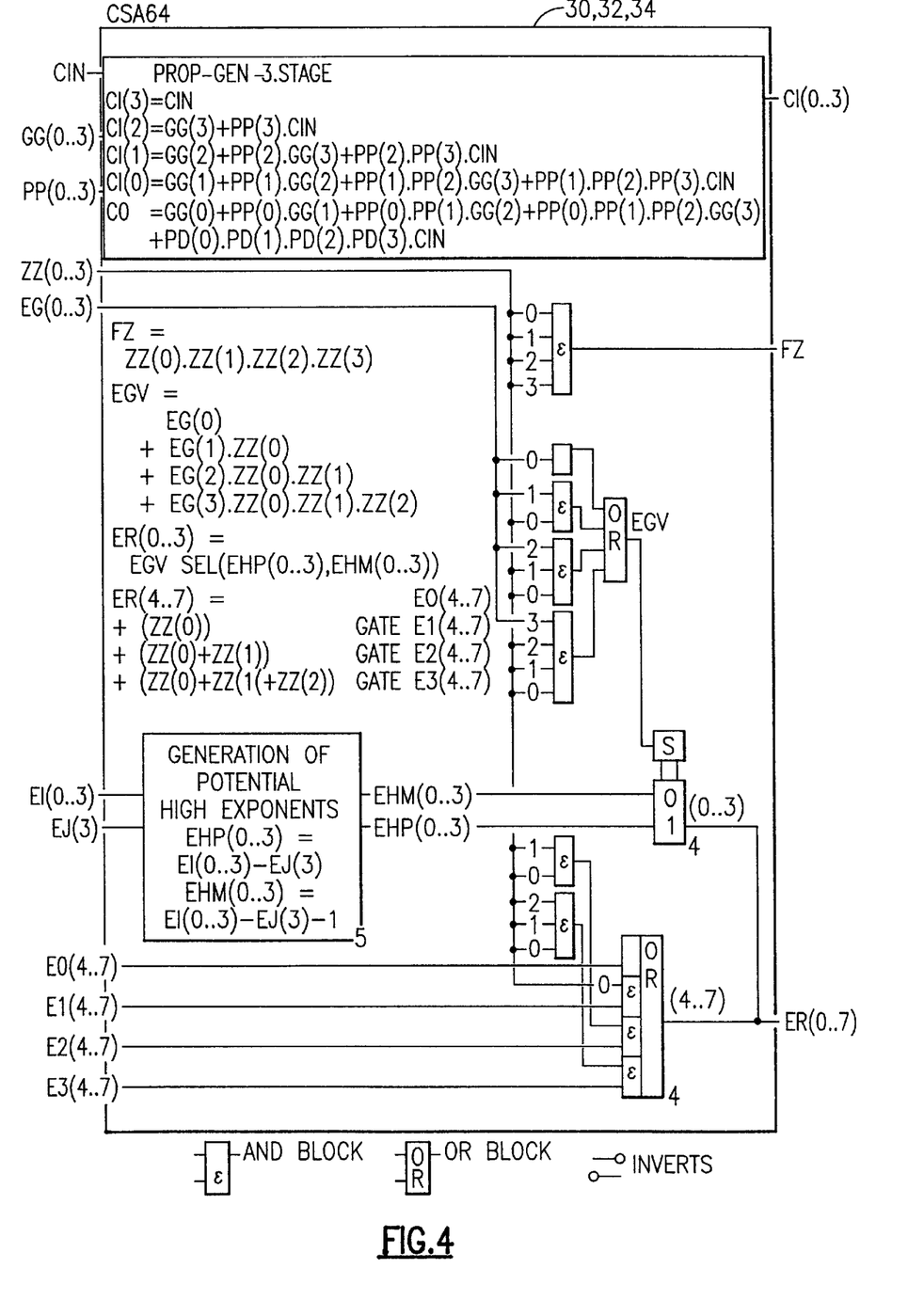
FIG. 4 is a schematic block diagram of the implementation of a 64 bit Carry Select Adder block from FIG. 2 in accordance with the present invention.

First, each CSA64 block receives the Generate and Propagate output from each CSA16 block connected with and serves as third stage of the Generate and Propagate procedure for generating the Carry In (0 . 3) signals.

Furthermore, the CSA 64 blocks are post-connected to the CSA 16 blocks described above which can be seen from FIGS. 2A, 2B and 2C too. Thus, they are able to receive inputs from the latter ones. In particular and according to the present invention, there are four potential low Exponents E(4 . . . 7) available as input. The exponent of the first CSA16 which is not zero has to be selected. This is done using the ZZ signals as output from CSA16 blocks as shown in FIG. 4.

Further inputs are the signals EI(0 . . . 3) which are received from the input Exponent and the input signal EJ(3) which indicates to a CSA64 block if it is the high or the low order block and finally a Carry representing signal which is set to '0' in the CSA64 block calculating without Carry (FIG. 2B) and set to '1' in the CSA64 block calculating with Carry (FIG. 2C).

For selection of the higher Exponent bits the internal signal EGV is needed. EGV is built by selecting one of the four potential EG signals. Again, the EG signal of the first CSA16 block which is not zero is selected.

The preselection Exponents EHP(0 . . . 3) and EHM(0 . . . 3) can be built as 4 bit state-of-the-art decrementer because their operation is not timing critical in the diction of the present invention.

The function thus described is realized in the implementation shown in FIG. 4.

For more detailed explanation a description by means of the corresponding Boolean equations or expressions is given again:

$$EHP(0 \ldots 3) = EI(0 \ldots 3) - EJ(3)$$

$$EHM(0 \ldots 3) = EI(0 \ldots 3) - EJ(3) - 1$$

$$CI(0) = CIN$$

$$CI(1) = GG(3) + CIN \cdot PP(3)$$

$$CI(2) = GG(2) + GG(3) \cdot PP(2) + CIN \cdot PP(2) \cdot PP(3)$$

$$CI(3) = GG(1) + GG(2) \cdot PP(1) + GG(3) \cdot PP(1) \cdot PP(2) + CIN \cdot PP(1) \cdot PP(2) \cdot PP(3)$$

$$CO = GG(O) + GG(1) \cdot PP(0) + GG(2) \cdot PP(0) \cdot PP(1) + GG(3) \cdot PP(0) \cdot PP(1) \cdot PP(2) + CIN \cdot PP(0) \cdot PP(1) \cdot PP(2) \cdot PP(3)$$

$$FZ = ZZ(0) \cdot ZZ(1) \cdot ZZ(2) \cdot ZZ(3)$$

The calculations for the immediate Exponent normalization are as follows:

$$EHP(0 \ldots 3) = EI(0 \ldots 3) - EJ(3)$$

$$EHM(0 \ldots 3) = EI(0 \ldots 3) - EJ(3) - b`01'$$

$$EGV = EG(0) + EG(1) \cdot ZZ(0) + EG(2) \cdot ZZ(0) \cdot ZZ(1) + EG(3) \cdot ZZ(0) \cdot ZZ(1) \cdot ZZ(2)$$

$$ER(0 \ldots 3) = EGV\ SEL(EHP(0 \ldots 3), EHM(0 \ldots 3))$$

| | |
|---|---|
| ER(4..7) = | E0(4..7) |
| + (ZZ(0)) | GATE E1(4..7) |
| + (ZZ(0)+ZZ(1)) | GATE E2(4..7) |
| + (ZZ(0)+ZZ(1)+ZZ(2)) | GATE E3(4..7) |
| EN(0..7) = ( COb.Fzax + COb.FZAy) | GATE Erb (0..7) |
| +( COb. Fzax) | GATE Erax (0..7) |
| +( COb. Fzay) | GATE Eray (0..7) |

As can be seen from above the output signals CI(0 . . . 3), FZ and ER(0 . . . 7) are generated. With reference back to FIGS. 2A, 2B and 2C the output signals from each of the three CSA 64 blocks 30, 32, 34 are fed into the general output circuit 66 which calculates the final normalized Exponent EN according to the above mentioned formula and how can be seen in implemented form in FIGS. 2A, 2B and 2C.

LIST OF REFERENCE SIGNS

| | |
|---|---|
| 1 | 128 bit Adder |
| 10 | align mantissa |
| 12 | generate Input Exponent |
| 14 | add mantissas |
| 16 | calculate potential normalized exponent results |
| 18 | generate normalized Exponent determination information |
| 19 | information |
| 20 | finish mantissa addition |
| 22 | select correct normalized Exponent result |
| 30 | CSA64 |
| 32 | CSA64 |
| 34 | CSA64 |
| 36,. .50 | CSA16 |
| 60 | Add 4 digits block |
| 62 | Digit Preselect block |
| 64 | generate gate signals for Exponent calculation' block |
| 66 | general output circuit |
| 68 | normalized Exponent determination information circuit |

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

We claim:

1. A method for calculating a floating point addition in a data processing system, said method comprising the steps of:

aligning a plurality of mantissas and generating an Input Exponent for calculation of a normalized Exponent result; and adding said plurality of mantissas in a plurality of adders each processing a different higher or lower bit portion of a bit sequence of a floating point number, by further performing;

a) generating normalized Exponent determination information during said mantissa addition, said normalized Exponent determination information further being generated from said mantissa addition; and b) calculating at least two potential normalized Exponent results while adding said plurality of mantissas, one of said at least two potential normalized Exponent results being a correct normalized Exponent result; and c) selecting said correct normalized Exponent result by using carry information and said normalized Exponent determination information.

2. The method of claim 1 further comprising the steps of:

processing concurrently a plurality of portions of said floating point number by a plurality of adder devices;

processing relatively higher bit portions in a plurality of adder devices further defined by number of potential different carrys of lower bit portion adder devices.

3. The method of claim 2 further comprising the steps of:

processing said lower bit half portion of said floating point number by an adder device; and processing said higher bit half portion of said floating point number by at least two adder devices; one of said at least two adder devices calculating an addition result assuming carry from said lower portion adder device is equal to zero, and another of said at least two adder devices calculating an addition result assuming that carry from said lower portion adder device equals a value of 1.

4. The method of claim 3, further comprising the steps of:

generating parts of said potential Exponent result during mantissa addition; and putting said parts together using Zero Detect signals and Carry Select signals of a Carry Select Adder for said mantissa addition.

5. A floating point adder system for use in an electronic computer device, comprising:

means for aligning a plurality of mantissas and generating an Input Exponent for calculation of a normalized Exponent result; and means for adding said plurality of mantissas in a plurality of adders each processing a different higher or lower bit portion of a bit sequence for a floating point number, said adding means further comprising;

means for generating, during said mantissa addition, normalized Exponent determination information from said mantissa addition; and means for calculating at least two potential normalized Exponent results while adding said plurality of mantissas, one of said at least two potential normalized exponent results being a correct normalized exponent result; and means for selecting said correct normalized Exponent result by using carry information and said normalized Exponent determination information.

6. The system of claim 5 further comprising means for processing concurrently a plurality of portions of the floating point number by a plurality of adder devices, and means for processing relatively higher bit portions in a plurality of adder devices being defined by number of potential different carrys of lower bit portion adder devices.

7. The system of claim 6 further comprising:

means for processing said lower bit half portion of said floating point number having at least one adder device; and means for processing said higher bit half portion of said floating point number by at least two adder devices, one of said at least two adder devices calculating an addition result assuming carry value from said lower portion adder device is 0, and another of said at least two adder devices calculating an addition result assuming carry value from said lower portion adder device is 1.

8. The system of claim 7, further comprising means for generating parts of said potential Exponent result during mantissa addition; and means for putting said parts together using Zero Detect signals and Carry Select signals of a Carry Select Adder pertaining to said mantissa addition.

* * * * *

UNITED STATES PATENT AND TRADEMARK OFFICE
CERTIFICATE OF CORRECTION

PATENT NO. : 6,275,839 B1
DATED : August 14, 2001
INVENTOR(S) : Gerwig et al.

It is certified that error appears in the above-identified patent and that said Letters Patent is hereby corrected as shown below:

Title page,
"98117896" should be -- 98117896.5 --;

Column 2,
Line 43, "from FIG. 2" should be -- from Figures 2A, 2B and 2C --;

Column 5,
Line 5, "ZZ=ZDO.ZD1,ZD2,Z03" should be -- ZZ=ZDO.ZD1.ZD2. Z03 --;

Column 7,
Line 18, "E(6)=(ZD0 EQ23)+" should be -- E(6)=(ZD0 .EQ23)+ --;
Line 19, "(ZD0. ZD1 EQ03)+" should be -- (ZD0.ZDl .EQ03)+ --;
Line 20, "(ZD0,ZD1. ZD2 EQ01)+" should be -- (ZD0.ZDl. ZD2 .EQ01)+ --;
Line 21 "(ZD0.ZD1.ZD2. ZD3 EQ12)+" should be -- (ZD0.ZD1.ZD2.ZD3 .EQ12) --;
Line 22, "E(7)=(ZD0 EQ13)+" should be -- E(7)=(ZD0 .EQ13)+ --;
Line 25, "(ZD0. ZD1 EQ02)+" should be -- (ZD0. ZDl .EQ02)+ --;
Line 27, "(ZD0.ZDl. ZD2 EQ13)+" should be -- (ZD0.ZDl. ZD2 .EQ13)+ --;
Line 29, "(ZD0.ZD1.ZD2. ZD3 EQ02)" should be -- (ZD0.ZDl.ZD2. ZD3 .EQ02) --;

Column 8,
Line 17, "G67y = Zdy0.LGS0 + Zdy1.LGS1 + ZDy2.LGS2 + ZDy3.LGS3" should be -- G67y = ZDy0.LGS0 + ZDy1.LGS1 + ZDy2.LGS2 + ZDy3.LGS3 --;
Line 25, "EGy = Zdy0.EGS0 + Zdy1.EGS1 + ZDy2.EGS2 + ZDy3.EGS3" should be -- EGy = ZDy0.EGS0 + ZDy1.EGS1 + ZDy2.EGS2 + ZDy3.EGS3 --;
Line 27, "Ex(6)=(ZDx0 EQ23)+" should be -- Ex(6)=(ZDx0 .EQ23)+ --;
Line 30, "(ZDx0. ZDxl EQ03)+" should be -- (ZDx0. ZDxl .EQ03)+ --;
Line 31, "(ZDx0.ZDx1. ZDx2 EQ01)+" should be -- (ZDx0.ZDx1. ZDx2 .EQ01)+ --;
Line 34, "(ZDx0.ZDx1.ZDx2. ZDx3 EQ12)" should be -- (ZDx0.ZDx1. ZDx3 EQ12) --;
Line 36, "Ex(7)=(ZDx0 EQ13)+ " should be -- Ex(7)=(ZDx0 .EQ13)+ --;
Line 37, "(ZDx0. ZDxl EQ02)+" should be -- (ZDx0. ZDxl .EQ02)+ --;
Line 39, "(ZDx0.ZDx1. ZDx2 EQ13)+" should be -- (ZDx0.ZDx1. ZDx2 .EQ13)+ --;
Line 44, "Ey(6)=(Zdy0 EQ23)+" should be -- Ey(6)=ZDy0 .EQ23)+ --;
Line 45, "(Zdy0. Zdyl EQ03)+ " should be -- (ZDy0. ZDyl .EQ03)+ --;

UNITED STATES PATENT AND TRADEMARK OFFICE
CERTIFICATE OF CORRECTION

PATENT NO. : 6,275,839 B1
DATED : August 14, 2001
INVENTOR(S) : Gerwig et al.

It is certified that error appears in the above-identified patent and that said Letters Patent is hereby corrected as shown below:

Column 8 cont'd.
Line 47, "(Zdy0.Zdy1. ZDy2  EQ0l)+" should be -- (ZDy0.ZDy1. ZDy2  .EQ0l) --;
Line 48, "(Zdy0.Zdy1.ZDy2. ZDy3. EQ12)" should be -- (ZDy0.ZDy1.ZDy2. ZDy3 .EQ12) --;
Line 50, "Ey(7)=(Zdy0  EQ13)+" should be -- Ey(7)=(Zdy0 .EQ13)+ --;
Line 51, "(Zdy0. Zdy1  EQ02)+" should be -- (ZDy0. ZDy1 .EQ02)+ --;
Line 52, "(Zdy0.Zdy1. ZDy2  EQ13)+" should be -- (ZDy0.ZDy1. ZDy2 .EQ13)+ --;
Line 55, "(Zdy0. Zdy1. ZDy2. ZDy3.  EQ02)" should be -- (ZDy0.ZDy1.ZDy2. ZDy3.  EQ02) --;

Signed and Sealed this

Tenth Day of September, 2002

Attest:

JAMES E. ROGAN
*Attesting Officer*     *Director of the United States Patent and Trademark Office*